United States Patent [19]
Ukuda

[11] Patent Number: 5,893,907
[45] Date of Patent: Apr. 13, 1999

[54] APPARATUS AND SYSTEM FOR MANAGING A CARD NUMBER

[76] Inventor: Shuko Ukuda, 1-46-6, Nishitobe-cho Nishi-ku, Yokohama City, Kanagawa 220, Japan

[21] Appl. No.: 08/731,831

[22] Filed: Oct. 21, 1996

[30] Foreign Application Priority Data

Oct. 26, 1995 [JP] Japan ............................ 7-279179

[51] Int. Cl.$^6$ .................................................. G06F 19/00
[52] U.S. Cl. .................................... 705/35; 902/29
[58] Field of Search ......................... 705/33, 35, 41, 705/42; 902/25, 26, 29; 235/375, 379, 380

[56] References Cited

U.S. PATENT DOCUMENTS

| | | | |
|---|---|---|---|
| 5,177,342 | 1/1993 | Adams | 235/379 |
| 5,231,570 | 7/1993 | Lee | 705/38 |
| 5,714,743 | 2/1998 | Chiba et al. | 235/449 |

Primary Examiner—Melanie A. Kemper

[57] ABSTRACT

The apparatus of the present invention is directed to an apparatus and a system for managing a card number for so-called electronic money cards and comprises an interface means for handling the signals between the head and branch offices of an issuing authority such a bank or credit card company, both domestic and overseas, a processing means for internal processing and controlling based on the signals received from by this interface means, unused card number storage means for storing card numbers not yet used for issued cards, drawn unused card number storage means for storing unused card numbers when retrieving such numbers from each head office and branch, currently used card number storage means for storing card numbers issued and currently being used, and invalid card number storage means for storing numbers of cards that have no remaining balance. By utilizing this invention, card numbers can be efficiently and rationally managed so that large numbers of cards can be directly issued to customers by each domestic and overseas branch of a bank or credit card company in a timely and rapid fashion.

6 Claims, 18 Drawing Sheets

FIG. 9

BANK NAME
SCREEN FORMAT MENU

| FORMAT NO. | FORMAT NAME |
|---|---|
| F1 | SCREEN FORMAT MENU |
| F2 | FOREIGN CORRESPONDENT BANK LIST |
| F3 | REQUEST TO DRAW OUT FCB CARD NUMBER |
| F4 | CHECK LIST OF REMAINING DRAWN UNUSED FCB CARD NUMBERS |
| F5 | CARD INFORMATION |
| F6 | CHECK LIST OF UNAPPROVED CARD NUMBERS |
| F7 | CHECK LIST OF UNDISPATCHED CARD NUMBERS |
| F8 | CABLE CONFIRMATION OF CARD DATA DISPATCHED TO FCB |

| FORMAT CHANGE | 44 | END |

45

F1   BRANCH NO. _40_ FORMAT NO. _41_ CLERK _42_ DATE _43_

FIG. 10

BANK NAME
FOREIGN CORRESPONDENT BANK LIST

| COUNTRY | 50 | | |
|---|---|---|---|
| COUNTRY | CURRENCY | CORRESPONDENT BANK | BANK CODE |
| 51 | 52 | 53 | 54 |
| | | | |
| | | | |
| | | | |
| | | | |
| | | | |

57 — COPY    FORMAT CHANGE    55    END
                                        56

F2    BRANCH NO. ____ FORMAT NO. ____ CLERK ____ DATE ____

FIG. 11

```
BANK NAME
REQUEST TO DRAW OUT FCB CARD NUMBER
```

| BANK CODE | | | | — 60 | DATE _____ |

| FOREIGN CORRESPONDENT BANK | 61 |
|---|---|
| QUANTITY OF DRAWN CARD NUMBERS | 62 |

FORMAT CHANGE | YES | END
                  64    63

F3    BRANCH NO. ____ FORMAT NO. ____ CLERK ____ OFFICER ____

FIG. 12

BANK NAM
CHECK LIST OF REMAINING DRAWN
UNUSED FCB CARD NUMBERS

BANK CODE [    ] — 70                    DATE: _____

| FOREIGN CORRESPONDENT BANK | REMAINING CARD NUMBERS | RETURNING CARD NUMBERS |
|---|---|---|
| 71 | 72 | 75 |

73 — LIST OF REMAINING CARD NUMBERS

_____  _____  _____  _____
_____  _____  _____  _____
_____  _____  _____  _____
_____  _____  _____  _____
_____  _____  _____  _____

74 —[ FORMAT CHANGE  ]  [YES]  [END]
                         77    76

F4        BRANCH NO. ____ FORMAT NO. ____ CLERK ____

FIG. 13

BANK NAME
CARD INFORMATION

| BANK CODE | | CUSTOMER CODE | | REF. NO. |
|---|---|---|---|---|
| | 80 | | 86 | DATE |

| (1) CARD PAYING BANK | | | | |
|---|---|---|---|---|
| (2) CARD NO. | (3) CURRENCY | (4) CARD AMOUNT | (5) VALIDITY | |
| (6) CUSTOMER NAME: | | | (SEX: M . F) (BIRTH DAY: ) | |
| (7) ADDRESS: TEL.NO.: | | (8) MOTHER.MAIDEN NAME | | |
| (9) I.D.No. | | (10) P.I.N. | | |

| F.X. RATE | HOME CURRENCY | COMM. | TOTAL AMOUNT | CONTRA |
|---|---|---|---|---|
| 84 | | | | (ACC'T # OR CASH) |

83 — NO | YES    FORMAT CHANGE    END
             82                              81

F5   BRANCH NO. ____ FORMAT NO. ____ CLERK ____ OFFICER ____

FIG. 14

BANK NAME

CHECK LIST OF UNAPPROVED CARD NUMBERS

| BANK CODE | | | | — 90 | | DATE: _____ |

| FOREIGN CORRESPONDENT BANK | REMAINING QUANTITY |
|---|---|
| | |

UNAPPROVED CARD NUMBERS

_____  _____  _____  _____
_____  _____  _____  _____
_____  _____  _____  _____
_____  _____  _____  _____
_____  _____  _____  _____

| FORMAT CHANGE | | YES |

91

F 6    BRANCH NO. ____   FORMAT NO. ____   CLERK ____ OFFICER ____

FIG. 15

BANK NAME
CHECK LIST OF UNDISPATCHED CARD NUMBERS

BANK CODE [ ][ ][ ] —100          DATE: _____

| FOREIGN CORRESPONDENT BANK | REMAINING QUANTITY |
|---|---|
|  |  |

100 — UNDISPATCHED CARD NUMBERS

```
_____    _____    _____    _____
_____    _____    _____    _____
_____    _____    _____    _____
_____    _____    _____    _____
_____    _____    _____    _____
```

FORMAT CHANGE | 102 | YES
                         |
                        101

F7     BRANCH NO. ____  FORMAT NO. ____  CLERK ____ OFFICER ____

FIG. 16

```
                        BANK NAME
        CABLE CONFIRMATION OF CARD DATA DISPATCHED
               TO FOREIGN CORRESPONDENT BANK
```

| BANK CODE | □□□ —110 | | DATE: _____ |
|---|---|---|---|
| FOREIGN CORRESPONDENT BANK | | | QUANTITY DISPATCHED |
| | | | |

DISPATCHED CARD DATA

CARD PAYING BANK:

CARD NO.:      REF. NO:      ISSUING DATE:

CURRENCY & AMOUNT      VALIDITY DATE:

CUSTOMER NAME:

ADDRESS:

TEL. NO.:      I.D. NO.:      P.I.N.:

SEX:      BIRTH DAY:      MOTHER MAIDEN NAME:

| FORMAT CHANGE | 111 | YES | END |

112

F8      BRANCH NO. ____ FORMAT NO. ____ CLERK ____ OFFICER ____

APPARATUS AND SYSTEM FOR MANAGING A CARD NUMBER

BACKGROUND OF THE INVENTION

The present invention relates to an apparatus and system for card number, particularly in regards to card numbers used for bank cards, credit cards, etc.

Conventionally, the management or control of card numbers assigned to credit cards, ATM cards, cash cards, prepaid cards and the like as well as the control of the issuance of such cards, is generally concentrated in a so-called card center of the issuing bank or credit card company. That is, the handling of the card numbers and the issuing or production of the cards themselves is unilaterally carried out by such card centers. Consequently, branches of the bank or credit card company cannot freely or selectively issue such cards. Accordingly, since the handling and issuance of such cards are concentrated in such card centers as mentioned above, the following problems have arisen.

First, as the various functions required to issue such cards as well as manage the assigned card numbers are concentrated in a separate facility such as a card center, the headquarters and branches of bank and credit card companies cannot issue such cards directly to the customer.

Specifically, when a bank or credit card company receives a request for a card from a customer, the bank or credit card company (hereafter referred to as the issuing authority) forwards an issue order to the card center. Consequently, the time required from when the customer requested the card until the card is actually received usually requires at least a week. This makes it almost impossible to respond to a customers needs in a speedy or timely fashion.

SUMMARY OF THE INVENTION

Accordingly, one object of the present invention free from the above-mentioned problems arising from the use of a conventional card center.

Another object of the present invention is to provide an apparatus and system for efficiently and rationally managing a card number by which large numbers of cards can be directly issued to customers by each domestic and overseas branch of a bank or credit card company in a timely and rapid fashion.

With the above objects in view, the apparatus of the present invention comprises an interface means for handling the signals between the head and branch offices of the issuing authority, both domestic and overseas, a processing means for internal processing and controlling based on the signals received from by said interface means, unused card number storage means for storing card numbers not yet used for issued cards, drawn unused card number storage means for storing unused card numbers when retrieving such numbers from each head office and branch, currently used card number storage means for storing card numbers issued and currently being used, and invalid card number storage means for storing numbers of cards that have no remaining balance.

The present invention also resides in a system for managing a card number.

BRIEF DESCRIPTION OF THE DRAWINGS

The present invention will become more readily apparent from the following detailed description of the preferred embodiments of the present invention taken in conjunction with the accompanying drawings, in which:

FIG. 9 is a block view showing the constitution of one example of the operational computer terminal display according to the third embodiment of the present invention.

FIG. 10 is a block view showing the constitution of one example of the operational computer terminal display according to the third embodiment of the present invention.

Fig. 11 is a block view showing the constitution of one example of the operational computer terminal display according to the third embodiment of the present invention.

FIG. 12 is a block view showing the constitution of one example of the operational computer terminal display according to the third embodiment of the present invention.

Fig. 13 is a block view showing the constitution of one example of the operational computer terminal display according to the third embodiment of the present invention.

FIG. 14 is a block view showing the constitution of one example of the operational computer terminal display according to the third embodiment of the present invention.

FIG. 15 is a block view showing the constitution of one example of the operational computer terminal display according to the third embodiment of the present invention.

FIG. 16 is a block view showing the constitution of one example of the operational computer terminal display according to the third embodiment of the present invention.

DESCRIPTION OF THE PREFERRED EMBODIMENTS

First Embodiment

Figure 1:
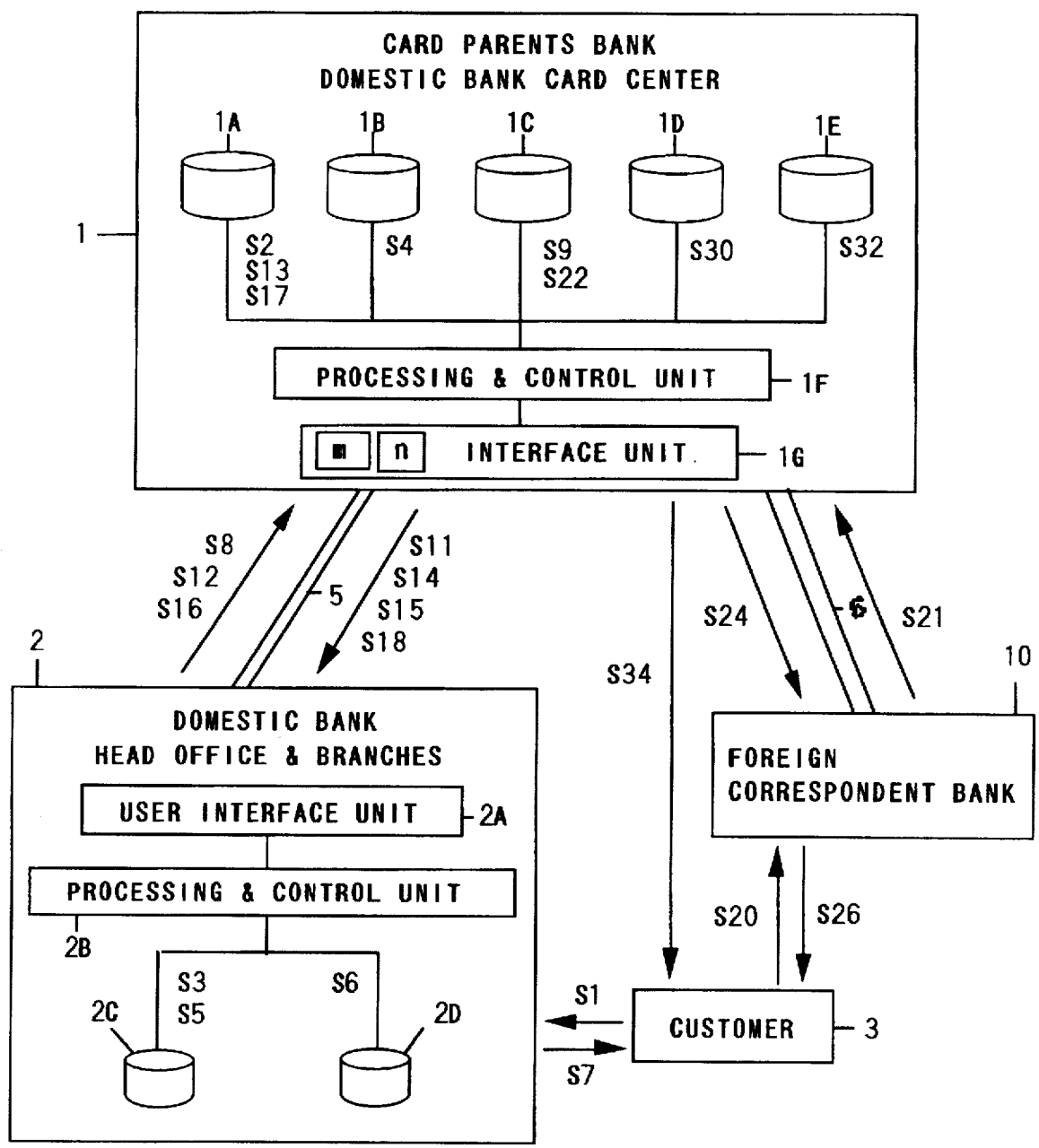
FIG. 1 is a block view of a first embodiment of the system for managing a card number including an apparatus for managing a card number of the present invention.

FIG. 1 is a block view of a first embodiment of the system for managing a card number including an apparatus for managing a card number of the present invention. This embodiment will be explained based on an example of the card authority being a domestic bank. In the figure, 1 is a domestic bank card center for managing card numbers of issued cards, etc., comprising the apparatus for managing card numbers of the present invention, and 2 is the head or branch office of the domestic bank. Here, the term branch office of the domestic bank (hereafter also referred to as head or branch office) includes both foreign and domestic branch offices. The head or branch offices 2 are connected to the domestic bank card center 1 by a first communication device comprising a dedicated communication line such as an ISDN line, cable or a SWIFT line, for example. A customer 3 purchases and uses a card issued by the head or branch office 2 or by a foreign correspondent bank that will be explained below. A foreign correspondent bank 10 or FCB, represents another banking entity overseas that carries on business with the domestic head or branch office 2. The FCB 10 is connected to domestic bank card center 1 through a second communication device 6 comprising an ISDN line, etc. Here, the domestic head or branch offices 2 and the foreign correspondent bank 10 will be collectively referred to as the branch offices of foreign and domestic card issuing authorities.

Also, as shown in FIG. 1, there are five files or units 1A-1E provided in the domestic bank card center 1. Basically, 1A is an unused card number storage means or unit for storing card numbers that are not yet being used. 1B is a drawn unused card number storage means or unit for storing drawn unused card numbers that have been withdrawn from the unused card storage unit 1A by domestic head or branch offices 2 or an FCB 10. File 1C is a currently used card number storage means or unit for storing card numbers that are currently being used along with such corresponding information as the name, address, sex, birth date, some ID card number, personal identification number or PIN, as well as the value of the card purchased. File 1D is an invalid card number storage means or unit for storing card numbers of cards in which the balance remaining has reached zero along with the above customer information. File 1E is a dormant card number storage means or unit that may be optionally provided when a card is assigned a validity date, for storing the card numbers of any cards that have reached their validity date with a remaining balance along with the above customer information and the account number of the special settlement account provided for such cards. Also, as shown in the figure, an interface unit 1G is provided in the domestic bank card center 1 to handle signals between the domestic head or branch offices 2 and the FCB 10. Further, a processing and control unit 1F comprising a CPU, etc., is provided for internal processing and control based on external signals received by interface unit 1G and also for controlling the storing, retrieving and reading out of the card numbers, etc. in the above five files 1A to 1E. Also, the customer 3 may be connected to interface unit 1G by an ISDN line, etc., if necessary.

Additionally, an automatic confirmation signal section m may be provided in interface unit 1G for automatically issuing a confirmation signal under the control of the processing and control unit 1F when an information signal such as a card issuance confirmation signal (explained in step S8 in FIG. 2) is received from a domestic head or branch office 2. This confirmation signal is issued to acknowledge the receipt of such information signals without the need for any extra operations by the user toward the domestic head or branch office 2. Further, an automatic tracer signal section n may also be provided in interface unit 1G for automatically issuing a tracer signal under the control of the processing and control unit 1F when a card number is not returned to the domestic bank card center 1, even when an unused card number is issued when a drawn card number is no longer needed by the domestic bank head or branch office 2, in order to trace such an unused card number. This unreturned unused card number tracer signal is issued without the need for any extra operations by the user toward the domestic head or branch office 2.

Also, within the domestic head or branch office 2 is provided a user interface means or unit 2A for handling the signals between the domestic bank card center 1, and the customer 3 or another domestic head or branch office, a processing and control means or unit 2B comprised of a CPU, etc., for internal processing and controlling based on the external signals input into the user interface unit 2A, and two files 2C and 2D to be described below. One of these files, 2C, is a head or branch office drawn unused card number storage file for storing unused card numbers from the unused card number storage unit 1A of the domestic bank card center 1. The other file 2D, is a head or branch office currently used card number storage file for drawing an unused card number from the drawn unused card number storage file 2C and storing the customer information and the drawn card number when issuing a card. Further, a means for issuing a card that uses the drawn number above to print or emboss a card is also provided in the domestic bank head or branch office 2 (refer to 22 in FIG. 8).

Additionally provided in the user interface unit 2A is an automatic data signal issuing unit (not shown) that is controlled by the processing and control unit 2B to automatically issue various data signals to be discussed below such as a card issuance signal (refer to step S8 in FIG. 2) and a signal for returning unused card number data (refer to S12 in FIG. 2) without the need for any special operation by the user.

Figure 2:
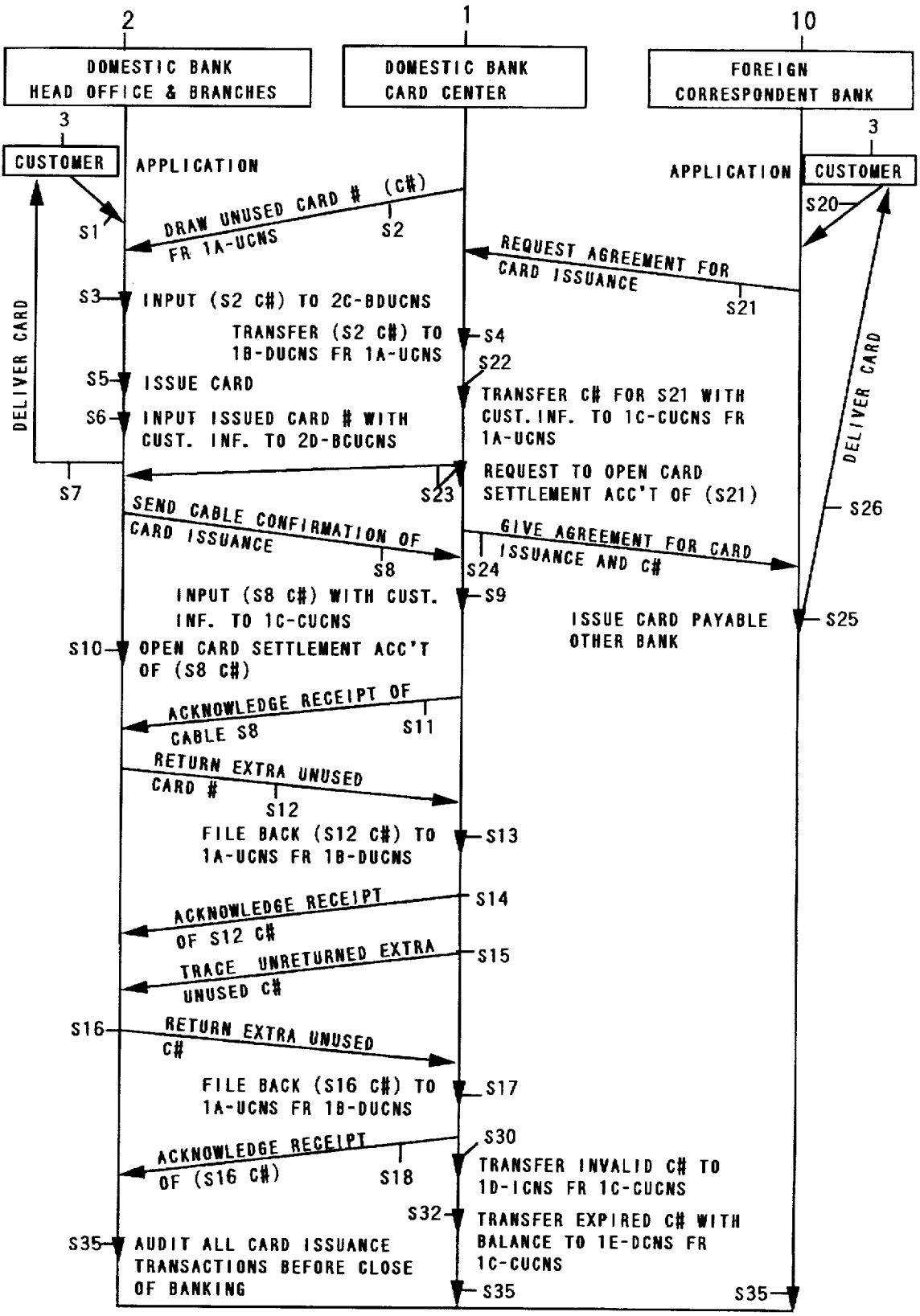
FIG. 2 is a timing chart showing the flow of the operations for issuing cards and managing card numbers in the system for managing a card number in FIG. 1.

Next, the operation of the bank network shown in FIG. 1 will be described. FIG. 2 is a timing chart showing the flow of operation. Further, the symbols S1, etc. are used interchangeably in both FIG. 1 and FIG. 2 to designate similar operational steps. First, the interaction between the domestic bank card center 1 and the head and branch offices 2 (here, the term branch office alone will be used) will be described. When the branch office 2 receives a request or application for a card (step S1) from a customer 3, an unused card number is drawn from unused card number storage unit 1A (step S2) in the card center 1 based on the control by the processing and control unit 1F through the user interface unit 2A, first communication device 5 and the interface unit 1G. At the same time, this drawn unused card number is temporarily stored in the drawn unused card number storage file 2C in the branch office 2 (step S3). Further, at this time the customer 3 pays the branch office 2 an amount corresponding to the value of card wanted and simultaneously provides an application containing the information necessary to obtain a card, that is his name, address, sex, birth date, some ID card number, personal identification number or PIN. On the other hand, the domestic bank card center 1 from which the unused card number was drawn, automatically moves that unused card number to the drawn unused card number storage unit 1B under the control of the processing and control unit 1F (step S4) while at the same time drawing up branch office data for the drawn card number.

Next, the branch office 2 issues the card (step S5) using the card number stored in drawn unused card number file 2C above. Also, at the same time the branch office 2 inputs this unused card number that was issued to the customer's card along with the necessary information described above, including the card value, into the currently used card number storage file 2D (step S6). Then, as the branch office 2 delivers the card to the customer 3 (step S7), the card number that was used for this card is read out from the currently used card number storage file 2D to initiate the sending of an issued card data signal (step S8) by the automatic data signal issuing unit in the user interface unit 2A informing the card center 1 of the issuing of the card as well as providing the customer information. As the card supplied to the customer 3 in this way may also be used for foreign exchange, the customer may also use it, within the limits of the purchased value, in foreign countries for shopping, hotels, etc.

On the other hand, when the domestic bank card center 1 receives the above issued card data signal containing the card number and customer information in S8, the card number received is automatically transferred under the control of the processing and control unit 1F from the drawn unused card number storage unit 1B to the currently used card number storage unit 1C (step S9) and at the same time, a card settlement account is automatically opened for that card number in the branch office 2 (step S10). Also, a confirmation signal confirming that the card center received the issued card data signal at S8, is automatically issued from the card center 1 via the first communication device 5 to the branch office 2 by the automatic confirmation signal section m in the interface unit 1G (step S11).

Next, an explanation will be made of the case where the branch office 2 does not use or no longer needs a card number even when it was drawn as an unused card number from the unused card number storage unit 1A of the card center 1. First, the branch office 2 returns the unused and unneeded card numbers (hereafter termed extra unused card numbers) from its drawn unused card number storage unit 2C, at or before the close of business, to the card center 1 while the automatic data issuing unit provided in the user interface unit 2A issues an extra unused card number return information signal informing the card center that this unused card number has been returned (step S12). Based on this extra unused card number return information signal, the card center 1, under the control of the processing and control unit 1F, automatically moves the corresponding card number from the drawn unused card number storage unit 1B back to the unused card number storage unit 1A so that it may be used again (step S13). Next, the card center 1 issues a signal, confirming that the information regarding the return of the extra unused card number was received from the branch office 2, from the automatic confirmation signal section m provided in interface unit 1G (step S14).

Also, when an unused card number has been stored in the drawn unused card number storage file 1B of the card center 1 for a specified time, that is when a certain amount of time has passed and there has been neither a card issued data signal (see S8) nor an extra unused card number return information signal (see S12) from the branch office 2 for a card number drawn from the unused card number file 1A by the branch office 2, the card center 1 will immediately issue, through the automatic tracer signal section n of interface unit 1G, an unreturned extra unused card number tracer signal (step S15) to the branch office 2. When the branch office 2 receives that tracer signal, the matter is investigated and if the card number has not been used, it immediately returns this number to the card center 1 via the first communication device 5 as well as issues, under the control of the processing and control unit 2B, a returned data signal from the automatic data issuing unit provided in user interface unit 2A informing the card center 1 that an extra unused card number has been returned (step S16). Based on that returned data signal, the card center 1, under the control of the processing and control unit 1F, automatically retrieves the card number from the drawn unused card number storage unit 1B and returns it to the unused card number storage unit 1A so that it may be used again (step S17). Next, the card center 1, under the control of the processing and control unit 1F, issues through the automatic confirmation signal section m, a confirmation signal acknowledging that the returned data signal has been received (step S18). Further, when it is found as a result of the investigation in response to the tracer for an unused card number, that for some unforseen reason no communication such as a card issued signal has been sent to the card center 1, even if the card number is actually being used, the card center is immediately informed of the present status of the card number by a signal issued from the branch office.

Further, although it was previously described that the tracer for an unreturned unused card number (refer to S15) was only issued after a specified amount of time has passed since the unused card number is stored in the drawn unused card number storage unit 1B in the card center 1, this is only one example of timing. For instance, the timing may also be set to be carried out after the close of business as this is about the time extra unused card numbers are returned to the card center 1.

Also, when none of the confirmation signals (S11, S14, S18) explained above are received from the card center 1 even after a specific period has passed, it is very possible that for some reason the card issued signal of S8, the signal for returning unused card number data of S12, or the returned data signal of S16 did not reach the card center 1. Accordingly, the branch office 2 may resend such signals to the card center 1. Also, if the signals are sent repeatedly with no confirmation signals received, as it may be due to some technical problem in the card center 1, an alarm or other such warning device (not shown) such as a warning message on a display connected to the processing and control unit 2B may be used to alert a person responsible in the branch office 2. Further, such a warning device may also be provided at the card center 1.

Next, the operation when there is no remaining balance for a card number stored in the currently used card number storage unit 1C will be explained. As no further deposit over the originally purchased value can be put into the card settlement account opened in the branch office 2, when the balance reaches zero, that account is automatically closed and the account becomes unusable. Consequently, as a signal confirming the closing of the account will be coming to the card center 1 from the branch office 2, based on that signal the card center 1 will automatically, under the control of the processing and control unit 1F, retrieve that used up number stored, along with the customer information in the currently used card number storage unit 1C, and transfer it to the invalid card number storage unit 1D (step S30 in FIG. 1). Also, as the card numbers can be used 10 years after being transferred in such a fashion to the invalid card number storage unit 1D, they will be transferred back to the unused card number storage unit 1A at that time.

Also, for cards that have a card number stored in the currently used card number storage unit 1C, the operation will be explained for cases where such cards have passed their invalidation date even though they still have a remaining balance. As soon as the invalidation date passes, the card center 1 under the control of the processing and control unit 1F will detect the event and transfer that card number and its accompanying customer data from the currently used card number storage unit 1C to the dormant card number storage unit 1E (step 32 in FIG. 1). At the same time, the card center 1 issues a signal directing the branch office 2 to transfer the balance remaining in the settlement account for that card number to a dormant account while simultaneously sending a notice to the customer informing him that the invalidation date has passed (step S34 in FIG. 1). Further, when 10 years have passed from that transfer, as the card number will be transferred back to the unused card number storage unit 1A, the remaining balance in the dormant account will be transferred to the profits and loss accounts of the domestic branch card center and counted as a profit. Also, as is normal practice, if the customer requests that profit portion at a later date, the branch office will respond immediately for the domestic branch card center 1 and refund the amount to the client.

Further, before the close of banking, the branch office 2 will carry out an audit of all card issuance transactions (step S35) to compare the confirmation signals (steps S11, S14, S18) and unreturned extra unused card number tracer signals (step S15) received from the card center 1 with the issued card data signals (step S8), the extra unused card number return information signals (step S12) and returned data signals (step S16) issued from that branch alone with the contents of the applications from customers 3, etc. If some problem arises as a result of this internal audit, the card center 1 is immediately contacted. Such an internal audit is also carried out before the close of banking by the domestic bank card center 1 and any foreign correspondent bank 10 (step S35).

Next, the operation between the domestic bank card center 1 and the head or branch office of a foreign correspondent bank or FCB 10 will be described. As shown in FIG. 2, when the FCB 10 receives a request or application for a card (step S20) from a customer 3, a request for agreement to issue a card based on that application is sent to the domestic bank card center 1 through the second communication device 6 (step S21). When the domestic bank card center 1 receives that request, an unused card number is drawn from unused card number storage unit 1A in the card center 1 based on the control by the processing and control unit 1F and stored in the currently used card number storage file 1C (step S22) while at the same time opens a card settlement account in the domestic bank head or branch office 2 (step S23). Simultaneously, the domestic bank card center 1 (also referred to as card center in this explanation) sends an agreement to issue a card as well as the unused card number that was drawn in an agreement to issue a card signal via the second communication device 6 (step S24). When the FCB 10 receives that unused card number, it issues a card payable at another bank (step S25) and delivers the card to the customer 3 (step S26). On the front of this card the logo of the FCB 10 as well as the information to the effect that the domestic bank 2 is the designated bank of payment can be printed thereon at this time.

Further, as the apparatus for managing a card number of the present invention is constructed as described above, the management of card numbers issued by banks, credit card companies, and various other card issuing businesses can be rationalized. In particular, by using this apparatus and system, domestic and foreign correspondent banks, that is foreign and domestic banks that have some sort of business agreement, can rapidly issue large numbers of travel cards to many travelers denominated in not only domestic but also various foreign currencies as well, to further enhance the efficiency of card issuing operations.

Additionally, by providing the unused card unit or file 1A, the drawn unused card file 1B, the currently used card number file 1C, the invalid card number file 1D and the dormant card number file 1E and having the card numbers successively and automatically moved and stored between any of those files 1A to 1E according to conditions under the control of the processing and control unit 1F, card numbers can be rationally and efficiently controlled or managed. Additionally, this also allows the issuance of cards between a domestic bank 2 and a foreign correspondent bank 10 to be carried out in a rapid and timely fashion when necessary.

Further, with the present system, as an automatic confirmation signal section m is provided in interface unit 1G for automatically issuing a confirmation signal when an information signal such as a card issuance confirmation signal is received from a domestic head or branch office 2, and an automatic tracer signal section n is also be provided in interface unit G for automatically issuing a confirmation signal in order to trace an unused card number, such signals can be automatically issued without the need for any extra operations by the user toward the domestic head or branch office 2 so that card issue confirmation operations, management of card numbers, etc. can be made even more reliable and secure.

Also, since a card number can be freely drawn from unused card file 1A when needed by the branch office 2, the needs of the customer can be met rapidly and further, a large number of cards can be issued in a short period of time.

Further, as the branch office 2 carries out confirming operations such as the audit of all card issuance transactions (step S35) to compare the confirmation signals (steps S11, S14, S18) and unreturned extra unused card number tracer signals (step S15) received from the card center 1 with the issued card data signals (step S8), the extra unused card number return information signals (step S12) and returned data signals (step S16) issued from that branch along with the contents of the applications from customers 3, etc., the internal inspection or auditing of card issuing operations can be performed simply and surely.

Additionally, when a foreign correspondent bank 10 sends a request for agreement to issue a card and the customer information to the domestic bank card center 1 through the second communication device 6 and receives a card number from the domestic bank card center 1, the FCB 10 can issue a card payable at the domestic bank 2 (step S25) in a timely fashion, so that it can even meet the urgent needs of a customer about to depart on a trip by issuing and delivering a card payable at a branch of a bank in the country or countries the traveler intends to go.

Second Embodiment

Figure 3:
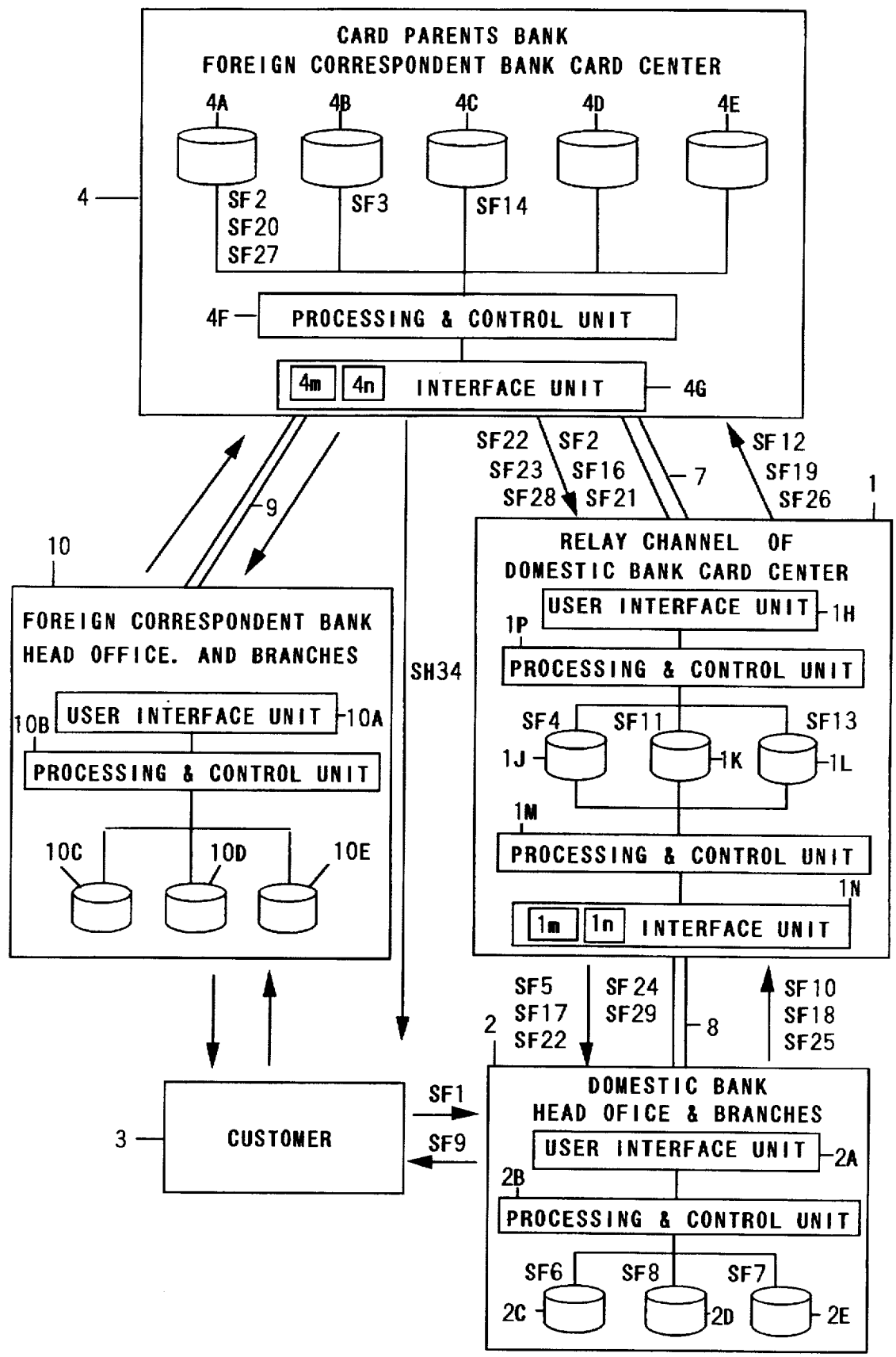
FIG. 3 is a block view of a second embodiment of the system for managing a card number including an apparatus for managing a card number of the present invention.

FIG. 3 is another embodiment of the system for managing a card number that includes the apparatus for managing a card number of the present invention. In this embodiment, the issuing companies will be a domestic bank head or branch office 2 and a foreign correspondent bank. In the figure, 1 is a domestic bank card center as explained in the first embodiment and in this embodiment, as explained below, comprises a relay channel connected between the card issuing device and card number managing device. Also in the figure, the domestic bank head office or branch 2 comprises a card issuing device in this embodiment and this is connected to the domestic bank card center 1 via a third communication device 8 comprising an ISDN line or other dedicated line such as a cable or SWIFT. A customer 3 has purchased and uses a card issued by the foreign correspondent bank. A foreign correspondent bank card center 4 is the card center for managing the issued card numbers, etc., and in this embodiment comprises the apparatus for managing a card number. The foreign correspondent bank card center 4 is connected to the domestic bank card center 1 via a fourth communication device 7 comprising an ISDN line or other dedicated line. A foreign correspondent bank head or branch office 10 may also be provided with the facilities to issue a card and further, when a branch office 10 functions as a card issuing facility similar to the domestic branch card center as described above, the foreign correspondent bank card center 4 (hereafter also abbreviated as FCB card center) acts as a relay facility, so that the domestic bank card center 1 becomes the actual card number managing apparatus. The foreign correspondent branch office 10 is connected to the FCB card center 4 via a fifth communication device 9 comprising an ISDN line or other dedicated line.

As shown in FIG. 3, there are five files or units 4A–4E provided in the FCB card center 4. Basically, 4A is a foreign bank side unused card number storage unit, 4B is a foreign bank side drawn unused card number storage unit, 4C is a foreign bank side currently used card number storage unit, 4D is a foreign bank side invalid card number storage unit, 4E is a foreign bank side dormant card number storage unit. Further, as the above files 4A–4E have the same function and construction as files 1A–1E in the embodiment shown in FIG. 1, their detailed description will not be provided here. Also, as shown in the figure, an interface unit 4G is provided in the FCB card center 4 to handle signals between the domestic bank card center 1 and the FCB 10. Further, a processing and control unit 4F comprising a CPU, etc., is provided for internal processing and control based on external signals received by interface unit 4G and also for controlling the storing, retrieving and reading out of the card numbers, etc. in the above five files 4A to 4E. Also, the customer 3 may be connected to interface unit 4G by an ISDN line, etc., if necessary.

As the construction of the domestic bank head or branch office 2 is substantially the same as shown in FIG. 1, the same reference numerals will be used here and the description thereof will be omitted. However, in this embodiment a file 2E is provided in addition to files 2C and 2D. This file 2E is a domestic bank head or branch office side unapproved card number file and is for temporarily storing card data such as the card number and customer information used when issuing a card at the time a card is issued using a card number drawn out from the drawn unused card number file 2C of the domestic bank branch office. The card data stored in this domestic bank head or branch office side unapproved card number file 2E is later stored in the domestic bank head or branch office side currently used card number file 2D after being approved by a designated bank officer, for example. Also provided in the domestic bank head or branch office 2 is a card printer (not shown, refer to 22 in FIG. 8) for issuing cards using an unused card number from the unused card number file 2C of the domestic bank branch.

Further, provided within the interface unit 4G in the FCB card center 4 are an automatic confirmation signal section 4m and an automatic tracer signal section 4n that are constructed and function similar to corresponding sections m and n in interface unit 1G in the first embodiment. Accordingly they will not be further described here.

As explained in the first embodiment shown in FIG. 1, there are five files 1A–1E in the domestic bank card center 1 (not shown here). However, there are also an additional 3 files 1J, 1K and 1L provided therein. Specifically, 1J is a drawn unused foreign bank card number file for the domestic bank card center 1 that stores unused card numbers drawn from the unused card number file 4A of the FCB card center 4. File 1K is an approved foreign bank card number file that temporarily stores the card number and customer data, etc., used when issuing a card at the time the domestic bank branch office 2 sends a confirmation of card issuance (step SF10 in FIG. 5) after drawing out a card number from drawn unused card number file 2C and issuing a card in that number. Card data and card numbers approved and sent from the domestic branch office 2 are stored sequentially in this file 1K. Then, at the close of business, this data is compiled and sent to the FCB card center 4 under the control of the processing and control unit 1P. By compiling and sending this data as a batch at the close of business communication can be rationalized in comparison to sending the related data singly as it is received, and this also helps to prevent various communications troubles arising from frequent use during the day. The file 1L is a currently used foreign bank card number file that before the close of business inputs and stores all of the card data and card numbers stored in file 1K.

Also, within the domestic bank card center 1 is provided a user interface means or unit 1H for handling the signals between the domestic bank card center 1 and the FCB card center 4. Further, a processing and control unit 1P comprising a CPU, etc., is provided for internal processing and control based on external signals received by interface unit 1H and also for controlling the storing, retrieving and reading out of the card numbers, etc. in the above three files 1J to 1L. Also, in the same fashion, an interface unit 1N is provided to handle the signals between the domestic bank card center 1 and the domestic bank head or branch office 2. A processing and control unit 1M is also provided similar to unit 1P for processing and control based on signals received from interface unit 1N. Further, provided within the interface unit 1N are an automatic confirmation signal section 1m and an automatic tracer signal section 1n that are constructed and function similarly to corresponding sections m and n in interface unit 1G in the first embodiment. Accordingly they will not be further described here.

Further, within the foreign correspondent bank head or branch office 10 (hereafter abbreviated as FCB branch office 10) is provided a user interface unit 10A for handling the signals between the customer 3 and the FCB card center 4. Further, a processing and control unit 10B comprising a CPU, etc., is provided for internal processing and control based on external signals received by user interface unit 10A and also for controlling the storing, retrieving and reading out of the card numbers, etc. in the three files 10C to 10E described below. Specifically, 10C is a drawn unused card number file for the FCB branch office 10 that stores unused card numbers drawn from the unused card number file 4A of the FCB card center 4. File 10D is an unapproved foreign bank card number file for the FCB branch office that temporarily stores the card number and customer data, etc. used when issuing a card at the time the FCB branch office 10 draws out a card number from drawn unused card number file 10C and issues a card in that number. The file 10E is a currently used card number file for the FCB branch office and is for inputting the data stored in file 10D after being approved by a designated bank officer, for example, as well as for noting and storing said approval.

Additionally provided in the user interface unit 10A is an automatic data signal issuing unit (not shown) that is controlled by the processing and control unit 10B to automatically issue various data signals to be discussed below such as a card issuance signal and a signal for returning unused card number data without the need for any special operation by the user.

Figure 4:
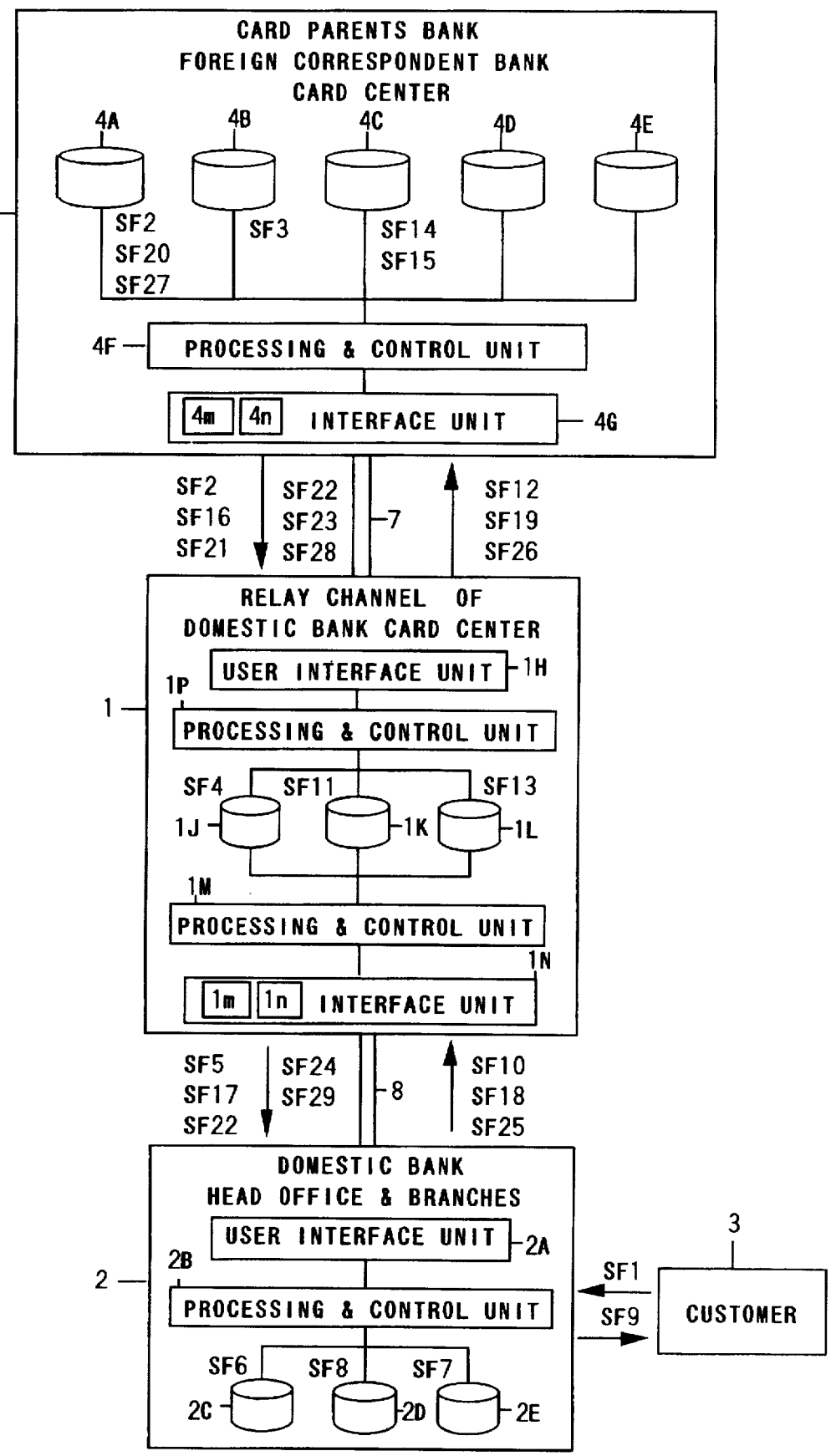
FIG. 4 is a block view of the second embodiment of the system for managing a card number including an apparatus for managing a card number of the present invention.
Figure 5:
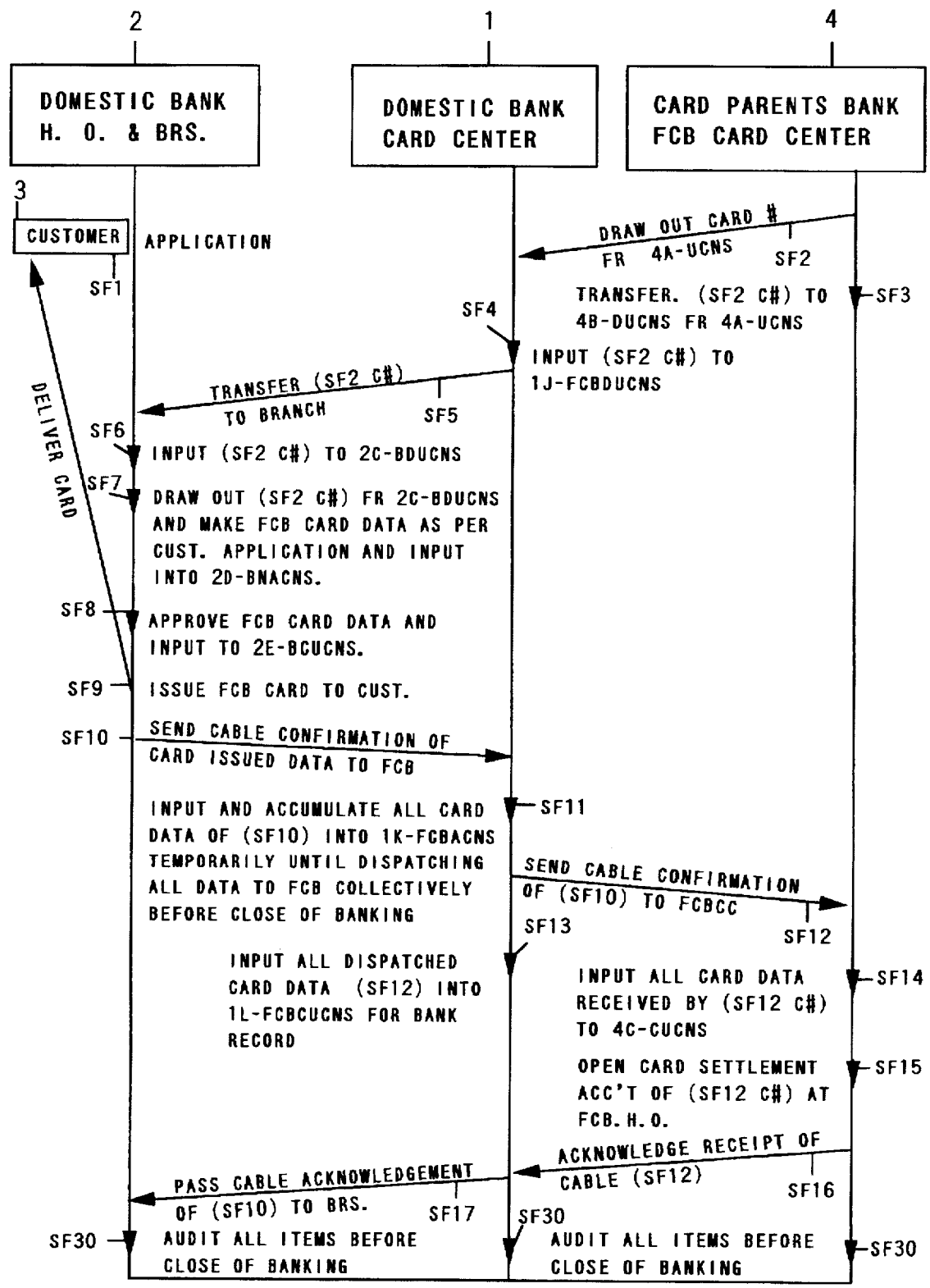
FIG. 5 is a timing chart showing the flow of the operations for issuing cards and managing card numbers in the system for managing a card number in FIG. 4.

Next, the operation of the system for managing a card number shown in FIG. 3 will be described. First, the interaction between the FCB card center 4 and the domestic branch office 2 will be explained. FIG. 4 shows the FCB card center 4, the branch office 2 and the domestic bank card center 1 from FIG. 3 for purposes of explaining this operation and FIG. 5 is a timing chart showing the flow of operation for issuing a card that takes place in FIGS. 3 and 4. Further, the symbols SF1, SH1, etc. are used interchangeably in FIGS. 3, 4 and 5 to designate similar operational steps. When the branch office 2 receives a request or application for a card (step SF1) from a customer 3, a signal is sent through the domestic bank card center 1 to draw an unused card number from unused card number storage unit 4A in the FCB card center 4 (step SF2) and an unused card number is drawn out from storage unit 4A based on the control by the processing and control unit 4F. Further, at this time the customer 3 pays the branch office 2 an amount corresponding to the value of card wanted and simultaneously provides an application containing the information necessary to obtain a card, that is his name, address, birth date, some ID card number, personal identification number or PIN.

On the other hand, the FCB card center 4 that drew the unused card number, automatically moves that unused card number to the drawn unused card number storage unit 4B under the control of the processing and control unit 4F (step SF3) while at the same time recording the domestic branch office data. Also at the same time, this card number is automatically input into the drawn unused card number file 1J of the domestic bank card center (Step SF4) and the data is recorded in every branch. This number is also simultaneously sent automatically from the domestic bank card center 1 to the domestic bank branch office 2 (step SF5), where it is temporarily stored in the drawn unused card number file 2C of the branch office 2 (step SF6). Personnel at the domestic bank branch 2 draw this card number from this file 2C, draw up card data based on the customer's application and temporarily input this data into the unapproved card number file 2E (step SF7). A bank officer of the domestic branch 2 then reads out this card data from file 2E, confirms the card data, and if appropriate approves the application. This is input and recorded in the currently used card number file 2D (step SF8), a card payable at a foreign bank is printed and issued with this number and the logo of the domestic bank, and then delivered to the customer 3 (step SF9).

Next, in the domestic branch 2, the card number that was used for this card is read out from the currently used card number storage file 2D to initiate the sending of an issued card data signal (step SF10) through the third communications device 8, by the automatic data signal issuing unit (not shown) in the user interface unit 2A informing the card center 1 of the issuing of the card as well as providing the customer information. Further, the card payable at a foreign bank supplied to the customer 3 in this way may also be used by the customer, within the limits of the purchased value, in foreign countries for shopping, hotels, other services, etc.

On the other hand, when the domestic bank card center 1 receives the above issued card data signal containing the card number and customer information in SF10, the card number received is automatically transferred under the control of the processing and control unit 1M from the drawn unused foreign bank card number storage unit 1J to the approved foreign bank card number file 1K, where such data is sequentially compiled just before the close of business (step SF11). Further, this card number is, of course, deleted automatically from the drawn unused foreign bank card number storage unit 1J at this time. Directly before the close of business, the domestic bank card center 1 sends a confirmation of issued card data related to the data successively input and compiled data into this approved number file 1K to the FCB card center 4 (step SF12). Also at this time, all of this compiled issued card data is moved from the approved number file 1K to the currently used foreign bank card file 1L (step SF13). On the other hand, when the FCB card center 4 receives the above issued card data signal, the card number received is deleted from the drawn unused card number storage unit 4B of the FCB and input and saved in the currently used card number storage unit 4C (step SF14). At the same time, a card settlement account is automatically opened for that card number in the FCB branch office 10 based on a signal sent out from the FCB card center 4 (step SF15). Also, a confirmation signal confirming that the FCB card center 4 received the issued card data signal of step SF12, is automatically issued from the FCB card center 4 via the fourth communication device 7 through the intermediary of the domestic bank card center 1 to the branch office 2 by the automatic confirmation signal section 4m in the interface unit 4G (step SF16). Additionally, a confirmation signal confirming that the domestic card center 1 received the issued card data signal at SF16, is automatically issued from the card center 1 via the third communication device 8 to the domestic branch office 2 by the automatic confirmation signal section 1m in the interface unit 1N (step SF17).

Further, before the close of banking, the domestic branch office 2, the domestic card center 1 and the FCB card center 4, will carry out an audit (step SF30) of all card issuance transactions (steps SF10, 12), confirmation signals (steps SF16, SF17; steps SF21, SF22 in FIG. 6 and steps SF28, SF29), extra unused card number return information signals (steps SF18, SF19 in FIG. 6) and the unreturned unused card number tracer signals (step SF24) along with the all accounting transactions concerning the total value of cards sold, commissions, etc. If some problem arises as a result of this internal audit, both the domestic and FCB card centers are immediately contacted.

Figure 6:
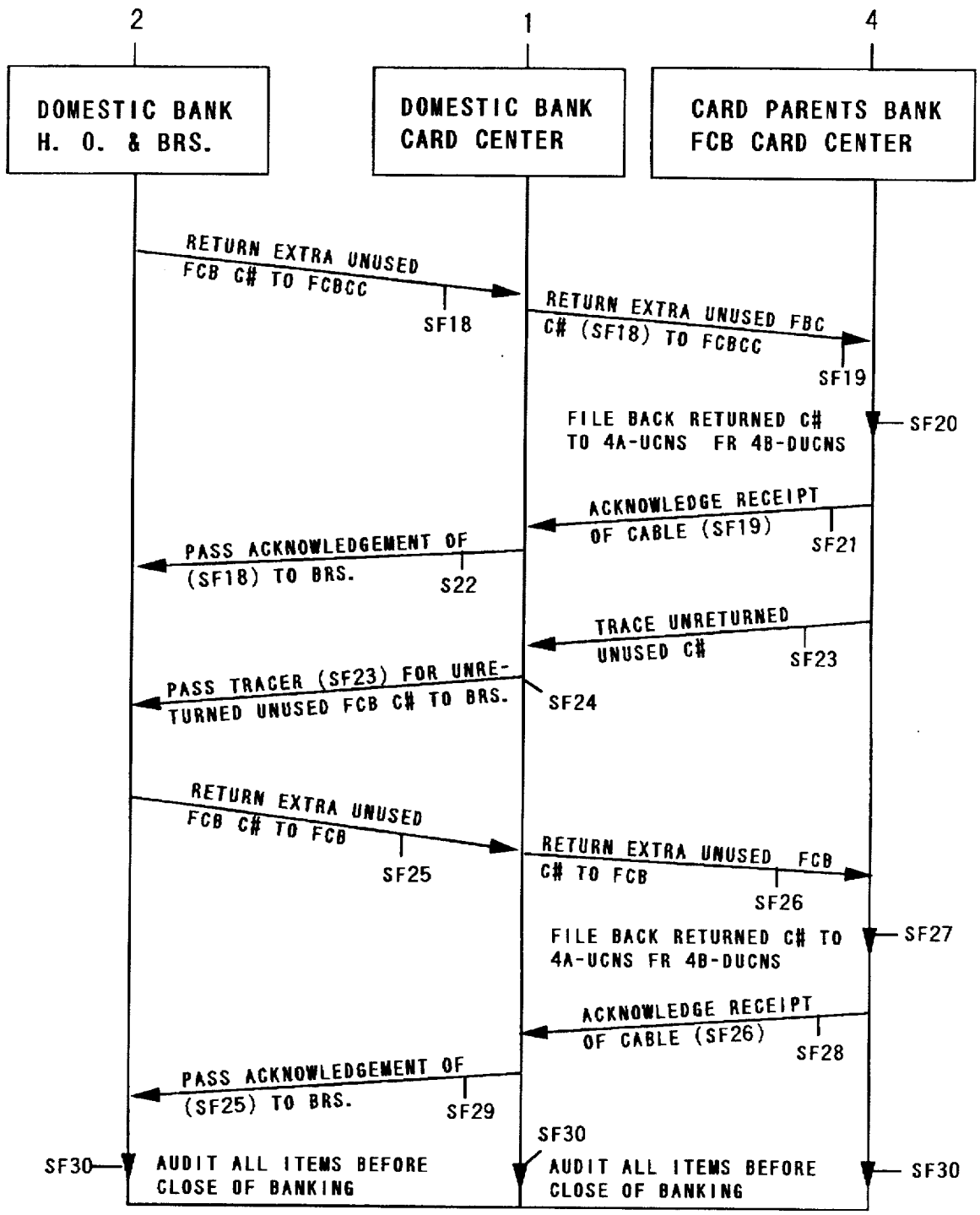
FIG. 6 is a timing chart showing the flow of the operations for returning unused card numbers in the system for managing a card number in FIG. 4.

Next, an explanation will be made of the case where the domestic branch office 2 does not use or no longer needs a card number even when it was drawn as an unused card number from the unused card number storage unit 4A of the FCB card center. FIG. 6 is a timing chart showing the flow of this operation. First, the domestic branch office 2 returns the extra unused card numbers from its drawn unused card number file 2C, at or before the close of business, to the domestic card center 1 while the automatic data issuing unit provided in the user interface unit 2A issues an extra unused card number return information signal informing the card center that that unused card number has been returned (step SF18). Based on this extra unused card number return information signal, the domestic card center 1, under the control of the processing and control unit 1M, automatically sends this signal to the FCB card center 4 and deletes the corresponding card number from the drawn unused foreign bank card number storage unit 1J. Then, under the control of the processing and control unit 4F and on the basis of this received signal, the FCB card center 4 returns this card number from the drawn unused card number file 4B back to the unused card number file 4A so that it may be reused (step SF20). The FCB card center 4 next issues a signal, confirming that the information regarding the return of the extra unused card number was received from the domestic branch office 2 via the domestic card center 1, from the automatic confirmation signal section 4m provided in interface unit 4G (step SF21). Upon receiving this signal, the domestic card center 1 automatically transfers it to the domestic branch office 2 from the automatic confirmation signal section 1m provided in interface unit 1N (step SF22).

The operation when there is an unused card number that has not been returned will next be explained. Specifically, when an unused card number has been stored in the drawn unused card number storage file 4B of the FCB card center 4 for a specified time, that is when a certain amount of time has passed and there has been neither a card issued data signal (see steps SF10 and SF12 in FIG. 5) nor an extra unused card number return information signal (see SF18, 19 in FIG. 6) from the domestic branch office 2 for a card number drawn from the unused card number file 4A, the FCB card center 4 will immediately issue, through the automatic tracer signal section 4n of interface unit 4G, an unreturned extra unused card number tracer signal (steps SF23, 24) to the domestic branch office 2 via the domestic card center 1.

When the domestic branch office 2 receives that tracer signal, the matter is investigated and if the card number has not been used, it immediately returns this number to the FCB card center 4 via the domestic card center 1. The domestic branch office 2 also issues, under the control of the processing and control unit 2B, a returned data signal from the automatic data issuing unit provided in user interface unit 2A informing the FCB card center 4 via the domestic card center 1 that an extra unused card number has been returned (steps SF25, 26). Based on that returned data signal, the domestic card center 1, under the control of the processing and control unit 1M, automatically deletes the card number from the drawn unused foreign bank card number storage unit 1J. On the other hand, within the FCB card center 4, this returned card number is returned, under the control of the processing and control unit 4F, from the drawn unused card number file 4B to the unused card number file 4A so that may be used again (step SF27).

Next, the FCB card center 4, through the automatic confirmation signal section 4m and via the domestic bank card center 1, sends a confirmation signal to the domestic branch 2 acknowledging that the returned data signal in steps SF25, 26 has been received (steps SF28, 29). Further, when it is found as a result of the investigation in response to the tracer for an unused card number, that for some unforseen reason no communication such as a card issued signal has been sent to the FCB card center 4, even if the card number is actually being used, the FCB card center 4 via the domestic card center 1 is immediately informed of the present status of the card number by a signal issued from the domestic branch office 2.

Further, although it was previously described that the tracer for an unreturned unused card number (refer to SF23, 24) was only issued after a specified amount of time has passed since the unused card number is stored in the drawn unused card number storage unit 4B in the FCB card center 4, this is only one example of appropriate timing. For instance, the timing may also be set to be carried out after the close of business as the extra unused card numbers are being returned to the FCB card center 4 at or just before the close of business.

Also, when none of the confirmation signals (steps SF16, 17; SF21, 22; SF28, 29) explained above are received from the FCB card center 4 even after a specific period has passed, it is very possible that for some reason the card issued signal of SF10, 12, the signal for returning unused card number data of SF18, 19, or the returned data signal of SF25, 26 did not reach the FCB card center 4. Accordingly, the domestic branch office 2 may resend such signals to the FCB card center 4 via the domestic card center 1. Also, if the signals are sent repeatedly with no confirmation signals received, as it may be due to some technical problem in the domestic or FCB card centers, an alarm or other such warning device (not shown) such as a warning message on a display connected to the processing and control unit 2B may be used to alert a person responsible in the domestic branch office 2. Further, such a warning device may also be provided at both the domestic or FCB card centers, or at the FCB branch office 10.

Next, the operation when there is no remaining balance for a card number stored in the currently used card number storage unit 4C of the FCB card center 4 will be explained. As no further deposit over the originally purchased value can be put into the card settlement account opened in the FCB branch office 10, when the balance reaches zero, that account is automatically closed and the account becomes unusable. Consequently, when a signal confirming the closing of the account comes to the FCB card center 4 from the FCB branch office 10, the FCB card center 4 will automatically, under the control of the processing and control unit 4F, retrieve that used up number stored, along with the customer information in the currently used card number storage unit 4C, and transfer it to the invalid card number storage unit 4D. Also, as the card numbers can be used 10 years after being transferred in such a fashion to the invalid card number storage unit 4D, they will be transferred back to the unused card number storage unit 4A at that time.

Also, for expired cards with a remaining balance that have a card number stored in the currently used card number storage unit 4C, the operation is similar to that for such cards as explained in the first embodiment (see steps S32, S34 in FIG. 1) except that it is between the FCB card center 4 and FCB branch or head offices 10. Accordingly, detailed explanation will be omitted here.

In the following portion, the operations between the FCB card center 4 and the FCB head or branch office 10 (in their home currency) will be described. As shown in FIG. 3 when the FCB 10 receives a request or application for a card (step SH1) from a customer 3, an unused card number is drawn from unused card number storage unit 4A (step SH2) in the FCB card center 4 based on the control by the processing and control unit 4F through the user interface 10A, fifth communication device 9 and the interface unit 4G. At the same time, this drawn unused card number is automatically transferred from the file 4A into the drawn unused card number storage file 4B (step SH3) while branch office data is drawn up in the FCB card center 4 under the control of the processing and control unit 4F, which is temporarily stored in the drawn unused card number storage file 10C (step SH4) in the FCB 10. Further, at this time the customer 3 pays the FCB 10 an amount corresponding to the value of the card desired and simultaneously provides an application containing the information necessary to obtain a card, i.e. name, address, sex, birth date, some ID card number, PIN, etc. Personnel at the FCB branch 10 draw this card number from file 10C, draw up card data based on the customer's application and temporarily input this data into the unapproved card number file 10D (step SH5). A bank officer of the FCB branch 10 then reads out this card data from file 10D, confirms the card data, and if appropriate approves the application. This is input and recorded in the currently used card number file 10E (step SH6), and at the same time, opens a card settlement account. Then, a card is printed and issued with this number and delivered to the customer 3 (step SH7).

The FCB branch 10 then sends a confirmation signal to the FCB card center 4 (step SH8). After receiving this signal, the FCB card center transfers this card number from the drawn unused card number file 4B into the currently used card number file 4C (step SH9) as well as informs the FCB branch 10 that the confirmation was received (step SH10).

If at this point, an unneeded extra unused card number that has been drawn is also generated at the FCB branch 10, an extra unused card number return information signal for returning that number is sent to the FCB card center 4 (step SH12), whereupon the FCB card center returns that card number from the drawn unused card number file 4B to the unused card number file 4A (step SH13). Then a confirmation signal is sent confirming that the extra unused card number return information signal was received (step SH14).

When there is an unreturned unused card number, the FCB 4 sends an unreturned unused card number tracer signal to the FCB branch 10 (step SH15). The FCB branch then performs a search for that number and if it is not being used, the card number will be deleted from the drawn unused card file 10C while a returned data signal is sent informing the FCB card center 4 that an extra unused card number has been returned (step SH16). The FCB card center 4 automatically retrieves the card number from the drawn unused card number storage unit 4B and returns it to the unused card number storage unit 4A so that it may be used again (step SH17). Then a confirmation signal is sent to the FCB branch 10 confirming that the returned data signal was received (step SH18). The remaining operations concerning the handling of used card numbers and dormant card numbers is essentially the same as described above and so will be omitted here.

Further, as the apparatus and system for managing a card number of the present embodiment is constructed as described above, the management of card numbers issued by banks, credit card companies, and various other card issuing businesses can be rationalized. In particular, by using this apparatus and system, domestic and foreign correspondent banks can rapidly issue large numbers of travel cards to many overseas travelers denominated in not only domestic but also various foreign currencies payable at other banks as well, to further enhance the efficiency of card issuing operations.

Figure 7:
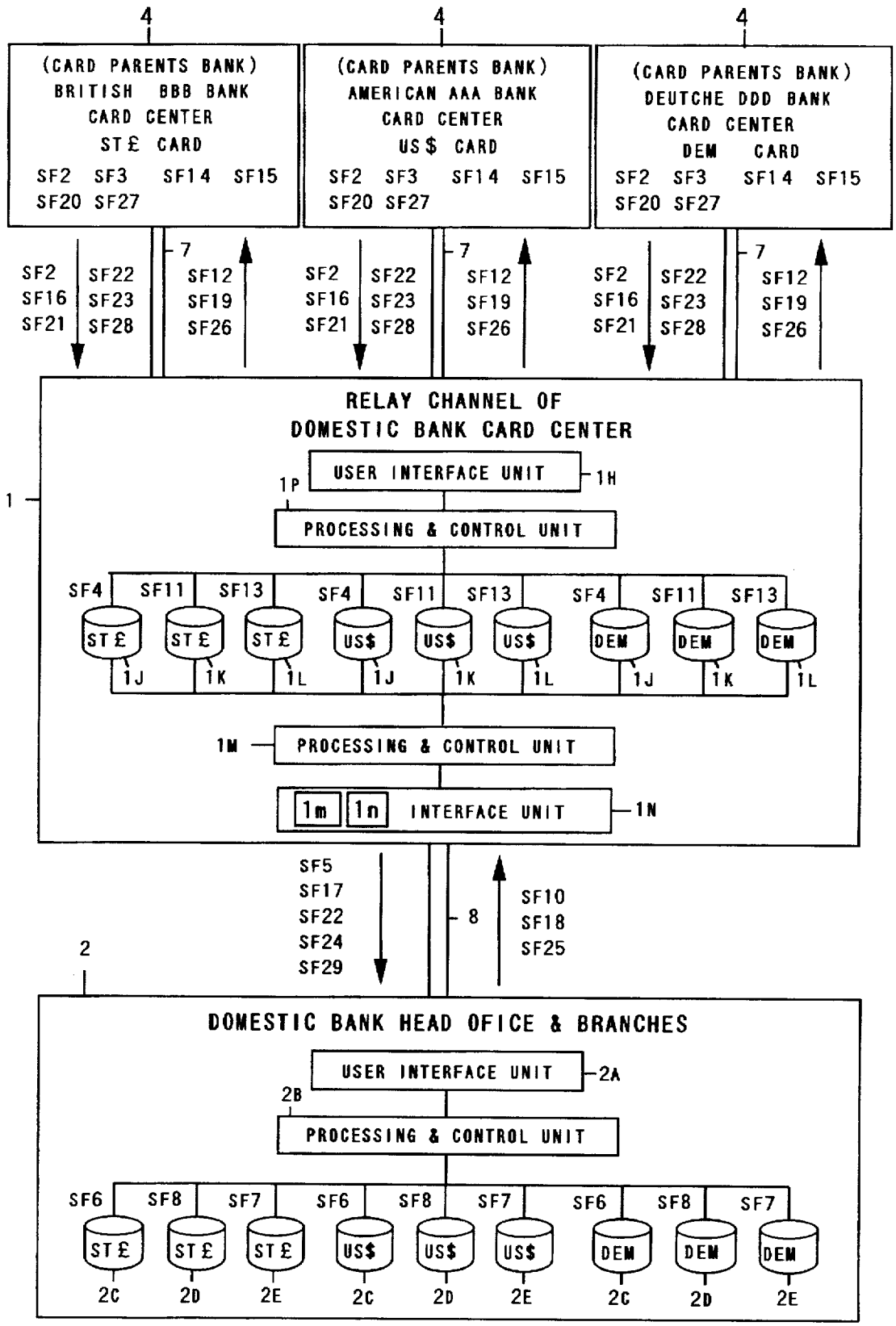
FIG. 7 is a block view of the system for managing a card number including an apparatus for managing a card number according to the second embodiment of the present invention.

Of course, the FCB head or branch office 10 as described above, can represent more than one FCB in more than one foreign country. As can be easily seen from the example in FIG. 7, a network comprising the system of the present invention can be constructed so as to connect English, German and American banks with a domestic bank card center located in Japan, for example. Further, although omitted in this figure, each FCB would be connected to their respective FCB card centers as described in FIGS. 3 and 4. Also as shown in FIG. 7, the domestic bank card center 1 may have a plurality of files 1J, 1K, and 1L dedicated to the respective currencies of each FCB. In a similar fashion, the domestic bank head or branch office may also have a plurality of dedicated files 2C, 2D, and 2E for the same purpose.

Figure 8:
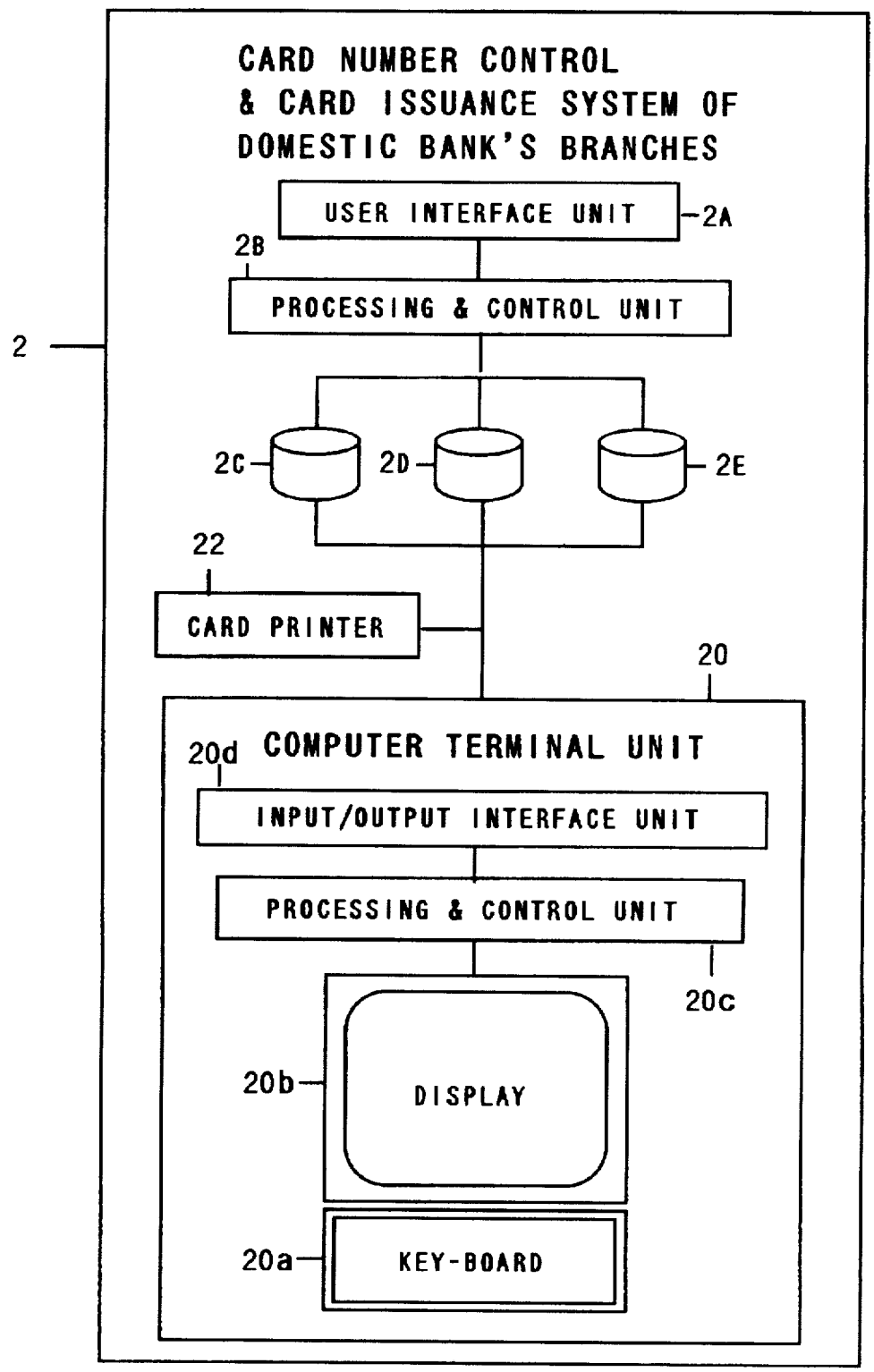
FIG. 8 is a block view of the system for managing a card number showing its constitution within the head office of a domestic bank according to the third embodiment of the present invention.

The following is a more concrete description of features that may be used to embody the system of the present invention. As such, they are to be construed as examples only and are not intended to limit the implementation of the present invention in any way. First, FIG. 8 shows an example of a operation input/output unit 20 as installed in a domestic bank head or branch office. Of course this unit is not limited to input by just a keyboard, but may be implemented by any other appropriate input/output means such as combinations of a keyboard and a mouse, electronic pens, voice activated systems and the like. Also, similar units may be installed in both the domestic and FCB card centers as well.

Figure 17:
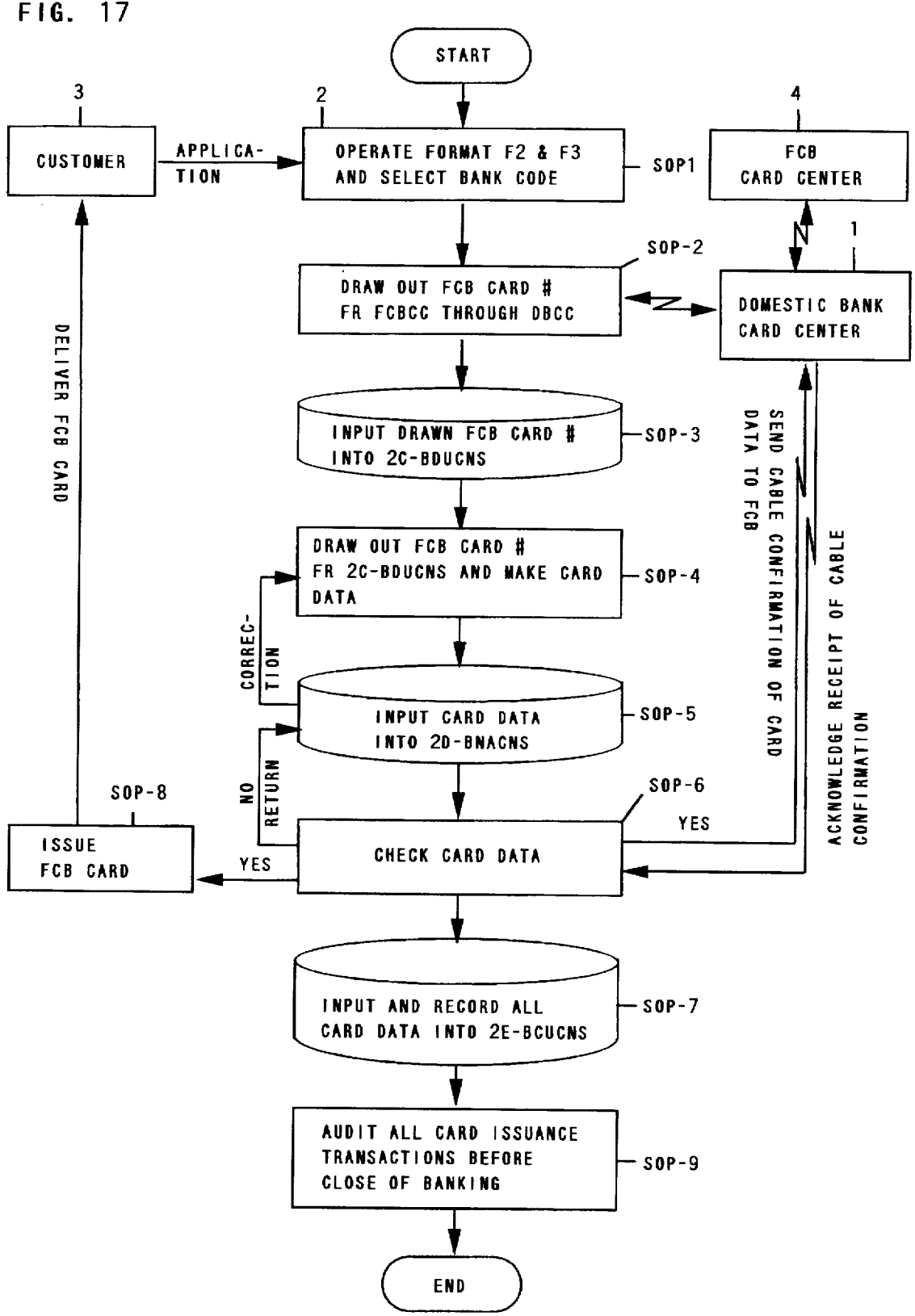
FIG. 17 is a flow diagram showing the operation of a domestic bank head office issuing a card payable at a foreign corresponding bank according to the second and third embodiments of the present invention.
Figure 18:
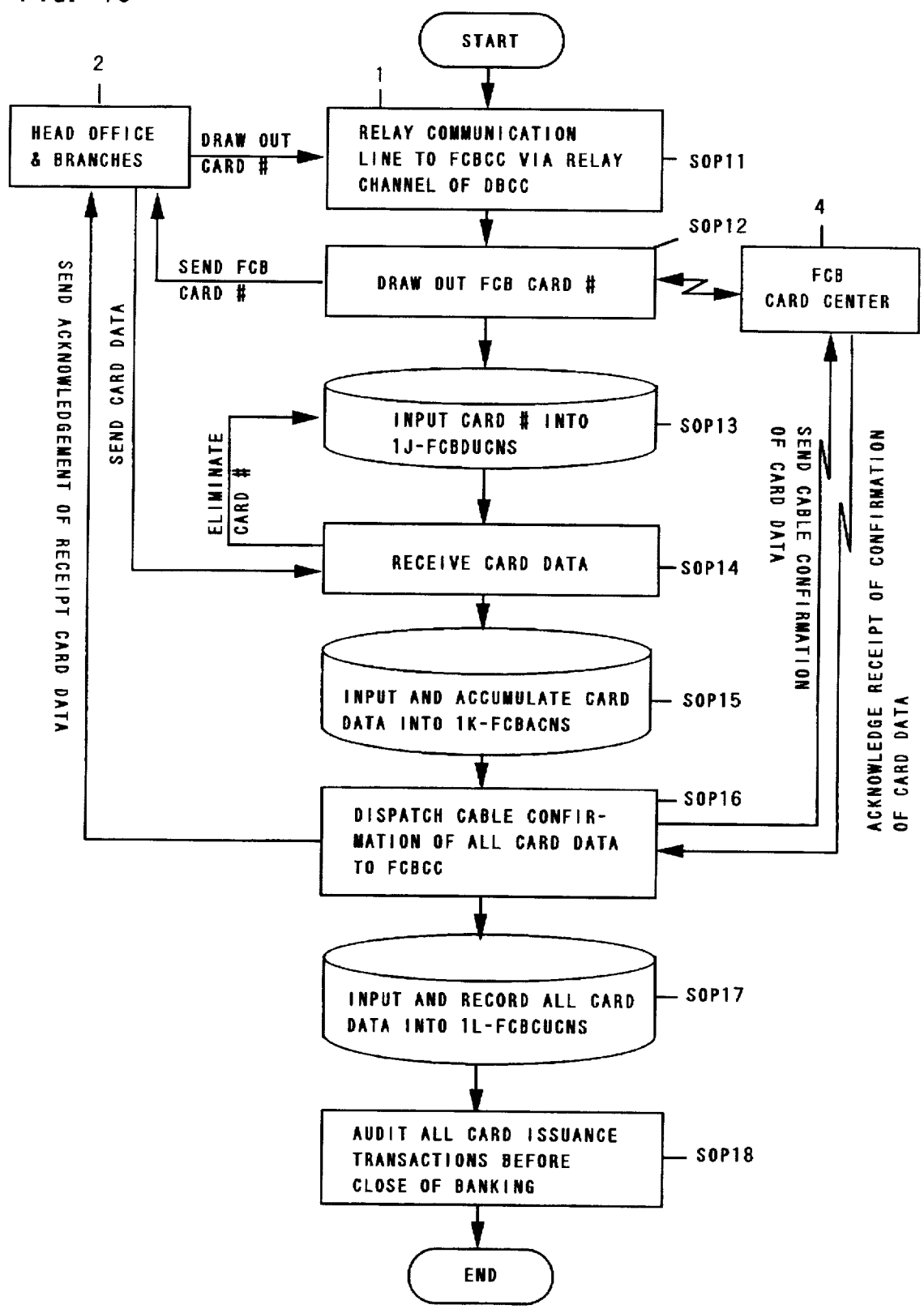
FIG. 18 is a flow diagram showing the operation of a domestic card center managing a card number of a foreign corresponding bank according to the second and third embodiments of the present invention.

FIGS. 9 to 16 show examples of the operational display on the operation input/output unit 20 during different operations of the present system and FIGS. 17 and 18 are flow charts showing the operation of a domestic card center or bank branch when issuing a card payable at an FCB. An example of an initial display when using this system is shown in FIG. 9 in which an operator can input the necessary bank and employee information and choose the appropriate format for the operation he wants to proceed with. The corresponding displays for Formats F2 to F8 in this example are shown FIGS. 10 to 16 respectively. FIG. 10 is a display for showing a list of foreign correspondent banks and their bank codes and appropriate units of currency. Here the desired bank is selected for the desired operation and the display exited as shown by steps SOP1 in FIG. 17 and SOP11 in FIG. 18. By selecting F3 in the display of FIG. 9 or in the format change box in FIG. 10, the display of FIG. 11 for requesting an FCB card number appears. This is an example of a display for drawing out a card number from the unused card file 4A of an FCB card center 4 and automatically loading them into the drawn unused FCB card number files 1J or 2C in the domestic bank card center 1 or branch office 2 (SOP3 and SOP18 in FIGS. 17 and 18 respectively). As can be seen from the figure, a number of cards can be drawn at one time.

Next, by selecting F4 in any of the previous displays, the display or screen of FIG. 12 will appear. This screen shows, the number of remaining card numbers in drawn unused card number file 2C for example, as well as a list of actual card numbers for the particular bank (bank code) entered in box 70. Of course, by entering a code such as 0000 or ****, for example, a list of remaining card numbers for all associated banks can be listed. By selecting F5, the screen of FIG. 13 will appear and here the format for the card to be issued can be determined. Specifically, in this example all of the application data from the customer 3, the card paying bank, currency, card value, validity date, etc., can be entered and confirmed before issuing a card (SOP5 in FIG. 17). Also, such predetermined information as the exchange rate of the day, service charge or commission and the total thereof, the value in the home currency, etc. can all appear automatically at this point. Further, by entering a code number already assigned or recorded for the customer, such as for a customer who regularly frequents the bank, not only can all of the customer information appear automatically as well, but the transaction may also be carried out by telephone or on-line communication.

Next, by entering F6 in any of the displays, the display shown in FIG. 14 appears. This screen is for the operator to check whether a card number has been approved by a bank officer or not so as to easily prevent an unapproved card number from being issued. Similarly, entering F7 will call up the screen shown in FIG. 15 where an operator can check a list of card numbers that have been approved but not yet sent to the requesting bank (here a branch or card center of an FCB). If there are no card numbers remaining non-dispatched, the operation can return to the initial screen shown in FIG. 9, but if there are non-dispatched card numbers, the operator can enter F8 to display the screen shown in FIG. 16. Here, the operator can determine and verify the data for an non-dispatched card number and then send it to the FCB card center 4. These last two displays can be provided to ensure that card numbers that were to be issued do not remain in the domestic card center or if for some reason some do remain, that such card numbers can be sent after the close of business for example, based on a final check of the days transactions.

As explained above, the screens just described have been provided for explanatory purposes only to help illustrate a mode for embodying the system of the present invention and as such are not intended to limit the present invention in any way.

What I claim is:

1. A system for managing a card number provided with a card number managing apparatus, a card issuing device, and a relay device for connecting said card number managing apparatus with said card issuing device wherein:

said card number managing apparatus comprises a managing apparatus side interface means for handling the signals between said relay device, a managing apparatus side processing means for internal processing and controlling based on the signals input to the interface means in said managing apparatus, a managing apparatus side unused card number storage means for storing card numbers not yet used for issued cards, a managing apparatus side drawn unused card number storage means for storing unused card numbers when such numbers are retrieved from said managing apparatus side unused card number storage means by said card issuing device through said relay device, a managing apparatus side currently used card number storage means for storing card numbers issued and currently being used, and a managing apparatus side invalid card number storage means for storing numbers of cards that have no remaining balance;

said relay device comprises a relay device side interface means for handling the signals between said card number managing apparatus and said card issuing device, a relay device side processing means for internal processing and controlling based on the signals input to the interface means in said relay device, a relay device side drawn unused card number storage means for storing unused card numbers when such numbers are retrieved from said managing apparatus side unused card number storage means by said card issuing device through said relay device, and a relay device side currently used card number storage means for storing card numbers issued by said card issuing device and currently being used; and said card issuing device being comprised of a card issuing device side interface means for handling the signals between said relay device, a card issuing device side processing means for internal processing and controlling based on the signals input to said card issuing device side interface means, a card issuing device side drawn unused card number storage means for storing unused card numbers when such numbers are retrieved from said managing apparatus side unused card number storage means, a card issuing means for issuing a card using an unused card number stored in said card issuing device side drawn unused card number storage means, and a card issuing device side currently used card number storage means for storing card numbers currently being used for issued cards.

2. A system for managing a card number as characterized in claim 1 wherein said card issuing device further comprises:

a card data construction means for constructing data required to issue a card based on customer information;

a card issuing device side unapproved card number storage means for temporarily storing said card data with said unused card number to be used to issue a card stored in said card issuing device side drawn unused card number storage means;

an approval means for outputting said card data along with said unused card number to said card issuing device and said relay device when the contents of said card data stored in said card issuing device side unapproved card number storage means is confirmed to be correct.

3. A system for managing a card number as characterized in claim 1 wherein said relay device further comprises a relay device side approved card number storage means for sequentially and for a specified period of time compiling and storing said card data along with said unused card number output by said approval means of said card issuing device, and for outputting said card data along together with said unused card number to said apparatus for managing a card number after said specified period of time has passed.

4. A system for managing a card number as characterized in claim 1 wherein said apparatus for managing a card number further comprises a managing device side dormant card number storage means for storing a card number of a card that has a remaining balance even when a validity date of the card has passed.

5. A system for managing a card number as characterized in claim 2 wherein said apparatus for managing a card number further comprises a managing device side dormant card number storage means for storing a card number of a card that has a remaining balance even when a validity date of the card has passed.

6. A system for managing a card number as characterized in claim 3 wherein said apparatus for managing a card number further comprises a managing device side dormant card number storage means for storing a card number of a card that has a remaining balance even when a validity date of the card has passed.

* * * * *